JAMES W. SMITH.
Improvement in Combined Grist-Mills and Cotton-Seed Hullers.

No. 114,215.  Patented April 25, 1871.

Witnesses:

Inventor:
James W Smith
per
Attorneys.

United States Patent Office.

JAMES W. SMITH, OF COLUMBUS, GEORGIA.

Letters Patent No. 114,215, dated April 25, 1871.

IMPROVEMENT IN COMBINED GRIST-MILLS AND COTTON-SEED HULLERS.

The Schedule referred to in these Letters Patent and making part of the same.

*To all whom it may concern:*

Be it known that I, JAMES W. SMITH, of Columbus, in the county of Muscogee and State of Georgia, have invented a new and improved Combined Grist-Mill and Cotton-Seed Huller; and I do hereby declare the following to be a full, clear, and exact description of the same, reference being had to the accompanying drawing making a part of this specification, in which—

Figure 1:
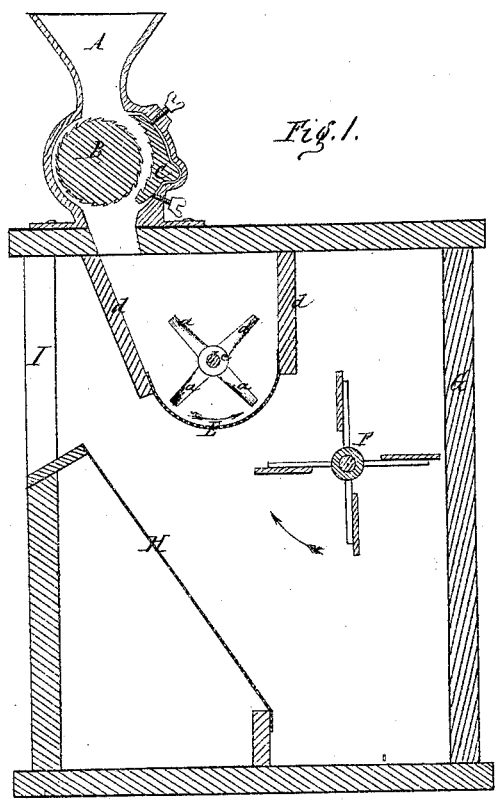
Figure 1 is a sectional elevation of the whole machine.
Figure 2:
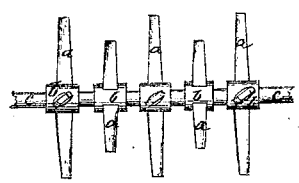
Figure 2 is a side elevation of the agitator.

This invention relates to the combination with the grist-mill for which Letters Patent No. 81,725 were issued to George N. Annan, September 1, 1868, of certain things to be hereinafter described, by which said grist-mill is adapted also to the function of hulling cotton-seed.

Referring to the drawing I have to state in the first place that all the change I have made in the grist-mill itself of the said Annan is by widening the throat of the receiver A so as to allow cotton-seeds in the hull, which are of greater bulk than corn, to feed freely to the crushing-cylinder B and concave plate C, and by making the teeth of said cylinder and plate more hook-shaped and longer in cross-section, so as to enable them to seize and draw downward the cotton-seeds, which are lighter than corn, and when in the hull harder to be caught by the teeth.

The additions I have made to Annan's mill are an agitator, a removable separator, E, and a fan-blower, F.

The agitator consists of a number of screw-blades, $a$, radiating from hubs $b$, which are secured upon a shaft, $c$, by means of set-screws, so as to be adjustable.

The shaft $c$ is mounted within the case G beneath and a little to one side of the cylinder B, and between partitions $d$, which inclose it at the sides.

With the lower ends of the partitions $d$ is connected the concave removable separator E.

The hubs $b$ are adjusted upon the shaft $c$ in such positions that the blades $a$ are arranged in spiral rows lengthwise of the shaft.

The cracked cotton-seed hulls which fall from between the cylinder B and plate C are received by the separator E and agitated by the blades $a$, which disengage the seeds from the hulls, cause the former to drop through the separator, and, by reason of their spiral arrangement, draw the hulls to one end of the separator, whence they fall off.

The seeds drop from the separator upon an inclined screen, H, from which the major part slides down to the foot of the screen, the finer portions falling through the latter.

The blast from the fan-blower F winnows the seed as it falls from the separator and drives the dirt, sand, and motes off through the opening I in the case.

When grinding corn the agitator and fan are rendered inoperative by unshipping their driving-belts, and the separator E is removed, so as to allow the meal and hominy to fall directly upon the screen H, through which the meal passes, and down which the hominy slides, as described in the aforesaid patent.

I disclaim the grist-mill patented by George N. Annan, September 1, 1868, and referred to herein.

Having thus described my invention,

What I claim as new, and desire to secure by Letters Patent, is—

The combination of the agitator $a\ b\ c$, separator E, and fan F, when arranged to be used in connection with the mill herein described, substantially as set forth.

JAMES W. SMITH.

Witnesses:
 THOS. D. D. OURAND,
 SOLON C. KEMON.